United States Patent [19]
Ditty
[11] Patent Number: 4,517,224
[45] Date of Patent: May 14, 1985

[54] METHOD FOR REMOVING A PHOSPHOR LAYER FROM A SUPPORT SURFACE

[75] Inventor: Lawrence H. Ditty, Clarks Summit, Pa.
[73] Assignee: RCA Corporation, Princeton, N.J.

[21] Appl. No.: 524,156
[22] Filed: Aug. 18, 1983
[51] Int. Cl.[3] .............................................. B32B 3/02
[52] U.S. Cl. ...................................... 427/64; 427/68; 427/421
[58] Field of Search .......................... 427/64, 68, 421

[56] References Cited

U.S. PATENT DOCUMENTS

| | | | |
|---|---|---|---|
| 2,710,286 | 6/1955 | Zachariason | 252/301.6 |
| 3,558,310 | 1/1971 | Mayaud | 96/36.1 |
| 3,788,846 | 1/1974 | Mayaud et al. | 96/36.1 |
| 4,049,452 | 9/1977 | Nekut | 96/36.1 |
| 4,165,396 | 8/1979 | Calamari, Jr. | 427/64 |

FOREIGN PATENT DOCUMENTS 48-22366 3/1973 Japan .

*Primary Examiner*—Shrive P. Beck
*Attorney, Agent, or Firm*—Eugene M. Whitacre; Dennis H. Irlbeck; LeRoy Greenspan

[57] ABSTRACT

In a method for preparing a luminescent screen which includes optionally depositing a light-absorbing matrix upon a support, depositing a phosphor-and-binder layer on the support, and then coating the phosphor layer with a film of organic polymeric material, the steps for salvaging the support and matrix, if present, substantially undisturbed while substantially entirely removing the overlying material. In the method, the overlying material is contacted with an aqueous hydroxide-and-peroxide solution until the binder and film are at least partially solubilized. Then, the overlying material is substantially entirely flushed away by flushing, sloshing, or low-pressure spraying with an aqueous medium.

6 Claims, 1 Drawing Figure

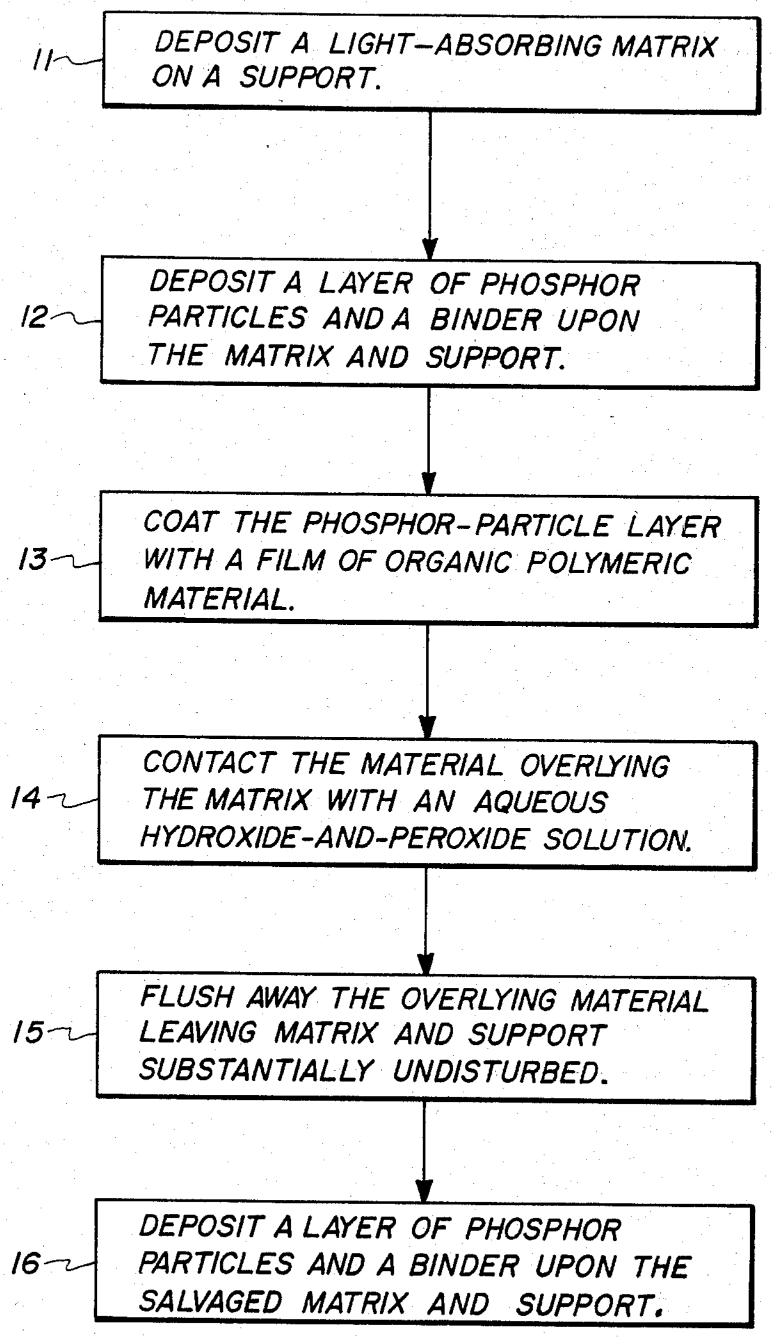
11
DEPOSIT A LIGHT-ABSORBING MATRIX ON A SUPPORT.
12
DEPOSIT A LAYER OF PHOSPHOR PARTICLES AND A BINDER UPON THE MATRIX AND SUPPORT.
13
COAT THE PHOSPHOR-PARTICLE LAYER WITH A FILM OF ORGANIC POLYMERIC MATERIAL.
14
CONTACT THE MATERIAL OVERLYING THE MATRIX WITH AN AQUEOUS HYDROXIDE-AND-PEROXIDE SOLUTION.
15
FLUSH AWAY THE OVERLYING MATERIAL LEAVING MATRIX AND SUPPORT SUBSTANTIALLY UNDISTURBED.
16
DEPOSIT A LAYER OF PHOSPHOR PARTICLES AND A BINDER UPON THE SALVAGED MATRIX AND SUPPORT.

METHOD FOR REMOVING A PHOSPHOR LAYER FROM A SUPPORT SURFACE

BACKGROUND OF THE INVENTION

This invention relates to a novel method for removing a phosphor layer from a support surface so that the support may be salvaged and reused. The novel method is particularly useful in preparing a luminescent viewing screen comprising a light-absorbing matrix wherein a defective in-process phosphor layer can be removed without disturbing the underlying matrix.

Some prior color-television picture tubes include a light-absorbing matrix as a structural part of the luminescent viewing screen. In such tubes, a light-absorbing matrix is supported on the inner surface of the faceplate panel of the tube. The matrix has a multiplicity of openings therein, which may be in the shpe of dots or lines, with phosphor filling each opening in the matrix, and with a specular metal layer over the phosphor.

In one sequence of fabrication steps commonly used in the picture-tube industry, the matrix is prepared by reverse printing, as described, for example, in U.S. Pat. Nos. 3,558,310 to E. E. Mayaud and 4,049,452 to E. M. Nekut. After such a matrix is deposited on the inner surface of a panel, a patterned layer of phosphor particles and a binder therefor is deposited photographically in the openings of the matrix. The phosphor layer is dried and then coated with a film of organic polymeric material as described, for example, in U.S. Pat. Nos. 3,582,389 and 3,582,390, both to T. A. Saulnier. The film is then metallized, usually by vapor-depositing aluminum metal thereon followed by baking in air to remove organic matter from the structure.

During the fabrication steps following the deposition of the matrix, some screens are found to be defective; for example, because the phosphor layer is blemished or out of position with respect to the matrix. By a prior salvaging method, the entire screen structure, including the matrix, is stripped from the panel of the tube, and a new screen structure is produced on the salvaged panel. Where the matrix is not defective, considerable savings can be realized if the matrix can be salvaged with the panel.

Attempts have been made to remove the material overlying the matrix by contacting the phosphor layer and film with one of the oxidizing solutions used to develop a matrix. Examples of such oxidizing solutions are disclosed in the Mayaud and Nekut patents cited above. Although most of the overlying material is removed with prior oxidizing solutions, nevertheless enough material remains to consider the panel and matrix unacceptable for recycling.

In other attempts to remove the material overlying the matrix, described in U.S. Pat. No. 4,165,396 issued Aug. 21, 1979 to J. A. Calamari, Jr., before the phosphor layer and film are baked, they are contacted with an alkaline solution, preferably of ammonium hydroxide, until the film is at least partially solubilized. Then the material overlying the matrix and support is flushed with an aqueous medium. It has been found in practice that substantially all of the overlying material is flushed away only if a relatively high-pressure spray or lance is used. A high-pressure spray or lance tends to erode the matrix, sufficiently altering the sizes of the apertures therein so that a substantial proportion of the salvaged matrices must be rejected as out of specification.

The novel method permits the material overlying the matrix to be substantially entirely removed without substantially disturbing or altering the matrix. If no matrix is present, the method may be used as a convenient and safe method for removing a phosphor layer of film from a support surface.

SUMMARY OF THE INVENTION

In the novel method, as in the prior art, a layer of phosphor particles and a binder therefor is deposited upon the surface of a support, and the phosphor layer is coated with a film of organic polymeric material. Optionally, a light-absorbing matrix may be deposited on the support surface prior to depositing the phosphor layer. Then, before metallizing the film and before baking to remove organic material in the screen structure, the film is contacted, as by spraying, with an aqueous solution of ammonium hydroxide and hydrogen peroxide until the film material and binder are at least partially solubilized. Then, the material overlying the support and matrix, if present, is substantially entirely flushed away with an aqueous medium. The solution is alkaline and preferably has a pH in the range of about 9.0 to 11.0. The solution contains, as essential ingredients, ammonium hydroxide and hydrogen peroxide.

By employing the hydroxide-and-peroxide solution according to the novel method, substantially all of the material overlying the support and matrix, if present, can be removed with a low-pressure spray or by sloshing with the aqueous medium, while the matrix remains substantially undisturbed. The salvaged support with the matrix, if present, may now be recycled, starting with the deposition of the phosphor layer, resulting in considerable savings in equipment and processing costs.

BRIEF DESCRIPTION OF THE DRAWING

The sole FIG. is a flow-sheet diagram of a preferred embodiment of the novel method.

DETAILED DESCRIPTION OF THE PREFERRED EMBODIMENT

A luminescent viewing screen is produced on the inner surface of a faceplate panel of a cathode-ray tube as described in the example of U.S. Pat. No. 3,788,846 to E. E. Mayaud et al. This includes depositing a light-absorbing graphite matrix on the surface, depositing a phosphor-particle layer upon the matrix and surface, coating an aqueous emulsion comprising acrylate copolymers on the phosphor layer, and drying the emulsion coating to form a film. At this point before metallizing, the viewing screen is inspected to determine whether it is defective in some respect, such as having a blemish in the phosphor layer, or having entrapped dirt, or having missing phosphor areas, etc. If the screen structure overlying the matrix is found to be unacceptable, and the matrix is acceptable, the film is sprayed and completely wetted with or without rotation, with an aqueous solution having a pH of $10\pm1$ and containing about 3 weight percent ammonium hydroxide and about 5 weight percent hydrogen peroxide. The panel may be in any orientation but is preferably positioned with the screen facing up. The material overlying the matrix becomes sufficiently solubilized in 5 to 60 seconds. Then, the solubilized screen is flushed with a gentle water spray until all of the material overlying the matrix is removed. A suitable spray is produced with nozzles having orifices about 0.4 to 0.6 mm (24 to 36 mils) in diameter and 80 to 100 psi water pressure. Another phosphor layer can now be deposited on the salvaged matrix.

SOME GENERAL CONSIDERATIONS

The sole FIG. is a flow-sheet diagram of the novel method. The novel method is applied to making luminescent screens for color-television picture tubes especially of the shadow-mask type. However, the invention may be applied to the making of any luminescent viewing screen which includes a phosphor-particle layer, with or without a light-absorbing matrix, which has been filmed with an organic polymeric material.

As indicated by the box 11, after the supporting surface for the screen has been cleaned, a light-absorbing matrix is produced thereon. This step is optional. Any of the methods described in the above-cited patents to Mayaud, Mayaud et al. and Nekut may be used. In each of these methods, a photosensitive polymeric film on a support surface is exposed to a light image, whereby selected areas of the film are insolubilized. The still-soluble portions of the film are washed away, and the retained insolubilized film portions and support surface are coated with particulate graphite or other light-absorbing material. A matrix is now developed by contacting the coating with an oxidizing solution, such as aqueous hydrogen peroxide, to remove the retained film portions and overlying material, while leaving the graphite that contacts the support surface undisturbed.

As shown by the box 12, a layer of phosphor particles is deposited on the matrix and support. For example, any of the methods described in the above-cited patents to Mayaud, Mayaud et al. and Nekut may be used. In each of these methods, the layer comprises a mosaic of different color-emitting phosphor areas. Each color is produced photographically by exposing a coating comprising the desired phosphor material and a light-sensitive binder to a pattern of light-in-solubilizing radiation, and then developing the pattern by washing away the still-soluble portions of the coating. Alternatively, a tacky binder pattern may be deposited on the matrix and support and phosphor powder adhered to the tacky pattern.

As shown by the box 13, the layer of phosphor particles is coated with a film of organic polymeric material. Any of the methods described in U.S. Pat. Nos. 3,067,055, 3,582,389 and 3,582,390, each issued to T. A. Saulnier, may, for example, be used. In each of these patents, an aqueous emulsion consisting predominantly of film-forming acrylate copolymers is coated on the phosphor layer. The emulsion coating is dried in such manner as to produce a film. The drying is preferably accompanied by some heating in order to develop a film with a specular surface. After forming the film, a specular metal layer may be produced on the film. Then, the structure is baked in air to remove the organic and volatile material in the structure.

After producing the film but prior to metallizing the film, for whatever reason, an unacceptable structure may be returned to salvage the matrix, if present, and its supporting panel and to repeat the steps shown by the boxes 12 and 13. Normally 10 to 20 percent of the structures are returned for salvaging. To this end, as shown by the box 14, the material overlying the matrix is contacted with an aqueous solution of ammonium hydroxide and hydrogen peroxide until the film material and binder are at least partially solubilized. The solution has a pH in the range of about 9.0 to 11.0. It is preferred to use solutions containing about 1.0 to 5.0 weight percent ammonium hydroxide $NH_4OH$. It is preferred to use solutions containing 3 to 10 weight percent hydrogen peroxide $H_2O_2$. The contacting can be achieved by spraying the solution on or flowing the solution over the surface.

The effect of contacting the material overlying the matrix with the hydroxide-and-peroxide solution is to solubilize the film and binder materials. It is believed that the solution penetrates the entire structure and acts selectively on the film and binder materials but does not affect the matrix, the support surface or the phosphor particles. The age of the structure after depositing the phosphor layer, the temperatures of the support surface and the solution, and other process variables affect the rate and efficiency of solubilization. It is preferred but not necessary that the structure be at least 24 hours old to effect efficient and rapid solubilization. Solubilization normally occurs in 5 to 60 seconds after the initial contact with the solution.

Wetting the structure with water before, or rinsing the screen after, contacting it with the hydroxide-and-peroxide solution may benefit the novel method under some conditions, although these steps are not required by the novel method. Generally, it is not necessary for the support or the solution to be heated to elevated temperatures in order to obtain desired results, although the process rate is increased by higher temperatures, and more careful process control may be necessary to insure consistency.

Aqueous solutions of oxidizing materials, such as hydrogen peroxide, which are used to develop the matrix, have been tried but have been found to leave undesirable residues of the film. This is attributed to the fact that these oxidizing solutions act on the binder for the phosphor particles and not on the film material. It is believed that the organic film material adheres to particles of the underlying phosphor layer and to the matrix and the support surface. The film material, which has phosphor particles attached, is not completely removed from the support and matrix by the oxidizing solutions that can be used to develop the matrix. Alkaline solutions of materials such as sodium hydroxide or ammonium hydroxide do not completely solubilize both film and binder materials. When high-pressure sprays are used to complete the removal of overlying material, a substantial proportion of matrices is eroded to the point where they are out of specification. However, and surprisingly in the novel method, after the overlying material is contacted with a hydroxide-and-peroxide solution which at least partially solubilizes the film material, all or substantially all of the overlying material is removed by simple flushing, sloshing, or low-pressure spraying.

As shown by the box 15, after solubilizing the material overlying the matrix as described above, the solubilized material is flushed away leaving a clean, substantially undisturbed matrix and support surface. Room-temperature water is adequate for this purpose, although, if desired, it may contain low concentrations of dispersing agents.

As shown by the box 16, a phosphor layer is deposited on the support surface in the openings of the salvaged matrix, essentially as indicated by the box 12 above. Then, the step indicated by the box 13 is repeated.

What is claimed is:

1. In a method for preparing a luminescent viewing screen including depositing a layer of phosphor particles and a binder therefor upon a surface of a support and coating said phosphor layer with a film of organic polymeric material, the steps, before metallizing said film, for substantially entirely removing said phosphor layer and film comprising (a) contacting said phosphor layer and film with an aqueous solution of ammonium hydroxide and hydrogen peroxide, said solution having a pH in the range of about 9 to 11, until said film material and binder are at least partially solubilized (b) and then flushing said surface with an aqueous medium until said film and phosphor layer are substantially entirely removed.

2. The method defined in claim 1 wherein, in step (a), a quantity of said solution is dispensed on said film and layer, then repeatedly sloshed over said film and layer, and then poured off.

3. The method defined in claim 1 wherein, in step (b), said aqueous medium is applied to said film and said layer by low-pressure spraying.

4. In a method for preparing a luminescent viewing screen including depositing a light-absorbing matrix upon a support surface, depositing a layer of phosphor particles upon said matrix and support surface and coating said phosphor-particle layer with a film of organic polymeric material the steps for substantially entirely removing said phosphor-particle layer and film while leaving said matrix substantially undisturbed, said steps before metallizing said film comprising:

(a) contacting said film with an aqueous solution containing about 1 to 5 weight percent of ammonium hydroxide and about 3 to 10 weight percent of hydrogen peroxide, until said film material is at least partially solubilized, said solution having a pH in the range of about 9.0 to 11.0, (b) and then flushing said support with an aqueous medium until said film and phosphor-particle layer are substantially entirely removed.

5. The method defined in claim 4 wherein said film consists predominantly of acrylate copolymers deposited from an aqueous emulsion thereof.

6. The method defined in claim 4 wherein said aqueous medium is applied to said film by low-pressure spraying and step (a) lasts for less than one minute.

* * * * *